United States Patent [19]

Beffel et al.

[11] Patent Number: 5,187,733
[45] Date of Patent: Feb. 16, 1993

[54] VERIFICATION OF SUBSCRIBER LINES PRIOR TO CUTOVER TO A NEW SWITCHING SYSTEM

[75] Inventors: Robert R. Beffel; Ellen R. Blood, both of Naperville; Paul R. Bufkin, Wheaton; Bernard M. Dennison, Randolph; Jerry G. Miller, Wheaton; James L. Turner, Lemont, all of Ill.

[73] Assignee: AT&T Bell Laboratories, Murray Hill, N.J.

[21] Appl. No.: 811,189

[22] Filed: Dec. 20, 1991

[51] Int. Cl.[5] .............................................. H04M 3/22
[52] U.S. Cl. ............................................ 379/10; 379/11; 379/18
[58] Field of Search ................... 379/9, 10, 11, 16, 17, 379/18, 25, 27, 29, 246, 325

[56] References Cited

U.S. PATENT DOCUMENTS

| | | | |
|---|---|---|---|
| 3,892,928 | 7/1975 | Casterline et al. | 379/18 |
| 4,059,731 | 11/1977 | Green et al. | 179/15 BY |
| 4,322,843 | 3/1982 | Beuscher et al. | 370/63 |
| 4,520,234 | 5/1985 | Fields et al. | 179/2 A |
| 4,653,043 | 3/1987 | Brady et al. | 370/13 |
| 4,833,708 | 5/1989 | Goodrich | 379/327 |
| 5,065,422 | 11/1991 | Ishikawa | 379/18 |

Primary Examiner—Stafford D. Schreyer
Attorney, Agent, or Firm—Charles L. Warren

[57] ABSTRACT

The present invention addresses an improved solution to the problem of cutover verification testing where a new digital switching system is to replace an existing switching system that serves at least a group of subscribers via continuous wire lines. It permits a plurality of existing wire lines to be concurrently connected to channel units associated with the new switching system without adversely impacting the existing service and automatic testing under the control of the new system.

48 Claims, 9 Drawing Sheets

VERIFICATION OF SUBSCRIBER LINES PRIOR TO CUTOVER TO A NEW SWITCHING SYSTEM

BACKGROUND OF THE INVENTION

This invention generally relates to the testing of subscriber lines prior to cutover of a replacement switching system. The invention more specifically relates to a system capable of subscriber line verification prior to replacing a switch providing conventional wire line service with an integrated digital carrier switch.

When an existing switch is being replaced, there exists a need to verify that a new switching system has been properly wired and configured so that the telephone number assigned a subscriber served by the existing switch is still associated with that subscriber by the new switch. A wiring error or an erroneous entry in the database of the new switching system could cause a service interruption to the subscribers of the old switching system.

FIG. 1 illustrates a known approach for verification of a subscriber line when switching from an analog switch to a different analog switch. An existing analog switch 10 provides service via path 12 to a main distribution frame (MDF) 14 having internal path 16 to external wire 18 which is connected to customer premise equipment (CPE) 20 such as a conventional telephone. A new analog switch 22 is connected by path 24 and path 26 in the MDF to line 18. New switch 22 is also connected to the analog switch 10 by an office-to-office (OTO) trunk 28. A directory number in new switch 22 believed to correspond to CPE 20 is transmitted over the OTO trunk 28 to analog switch 10. Switch 10 responds by establishing a metallic connection between trunk 28 and the MDF by paths 12 and 16. New switch 22 generates a contact closure on trunk 28. The test is successfully completed if the new switch 22 detects the closure at the MDF as coupled by paths 24 and 26. Failure to detect the closure within a predetermined time indicates that a wiring error or directory problem exists. If a problem does exist, this verification test permits it to be resolved prior to switching service for CPE 20 to the new analog switch 22. After a successful test, subscriber line 18 can be cut over to be served by new switch 22 through paths 24 and 26. Path 16 is cut to complete the transfer of service.

FIG. 2 illustrates a switching system in which existing subscriber lines 34 are to be cut over from an existing wire analog system to a digital carrier facility such as the AT&T Universal SLC® System. Existing analog switch 30 is connected by MDF 32 to a plurality of analog subscriber lines 34 which serve CPE 36 and 40. Subscriber line 38 connects the CPE 40 through the MDF to analog switch 30. The digital carrier system includes a central office terminal (COT) 42 connected by a digital communication channel 44, such as a T1 channel, to a remote terminal (RT) 46. The COT is normally located in the central office and the RT is located near the telephone equipment. Analog lines 48 between the COT and the MDF correspond to each subscriber line to be supported by the digital carrier system. After cutover, the RT will be coupled by a plurality of analog lines 50 to the subscriber equipment. A channel 44 utilizes multiplexed signals to carry information being communicated over each subscriber line coupled by the RT 46 and associated command and status signals. This digital system minimizes the number of long wire lines which must be maintained. A metallic test line 52 is connected between analog switch 30 and COT 42. Metallic test line 54 couples COT 42 and RT 46. The RT includes a channel test unit (CTU) 56 and a plurality of channel units (CU) 58 which provide interfaces for the different subscriber lines to be supported.

The pre-cutover testing of subscriber line 38 which supports CPE 40 is described as follows. A path 60 in MDF 32 establishes a connection between COT 42 and subscriber line 38 at the central office. An analog line 62 which is one of lines 50 connects CPE 40 to a CU in RT 46. The analog switch 30 utilizes a conventional pair gain test controller (not shown) to establish a continuous metallic path to line 62 via path 52, COT 42, path 54, CTU 56, and a CU 58. An off-hook condition forced by the analog switch 30 on the metallic test path will be reflected back to switch 30 via line 38 if the wiring is correct. Also the forced off-hook should be reported from the CU to the RT and COT and path 48 and 60 back to the switch 30. U.S. Pat. No. 4,653,043 assigned to the same assignee as the present patent, provides a more detailed description of the utilization of the metallic paths for pre-cutover verification.

It is important to note that each channel unit normally supplies battery to the CPE 36 as connected by lines 50. However, the channel test unit may be utilized with the metallic test lines to place one of the lines 50 in a test mode wherein the battery supply is disconnected. Thus, lines 50 are installed and tested one at a time in order to avoid a service impairment problem that could arise from providing parallel battery supplies from the analog switch via lines 34 and from the channel units via lines 50. Substantial technician cutover support is required to connect and verify each of the lines to be cut over to the digital carrier service.

FIG. 3 illustrates a conversion from an analog switch utilizing a universal digital carrier system to a digital switch utilizing an integrated digital carrier system. Like reference numerals in the FIGS. denote common elements. A digital switch 64, such as an AT&T 5ESS® system, provides digital switching and an integrated digital carrier system. A multiplexed channel 66 couples switch 64 to the multiplexed channel 44 which is utilized to provide service to CPE 36. Subscriber line verification testing is accomplished using metallic contact paths 52 and 54 in combination with the reception of signal information transmitted on channel 44 that is received by digital switch 64 via channel 66. An office-to-office trunk 68 allows switch 64 to establish a test connection through analog switch 30 and utilize metallic test paths 52 and 54 to provide verification testing prior to cutover of the subscriber service. A subscriber number contained in a directory number translation database in digital switch 64 is sent over the OTO trunk to analog switch 30 which initiates a corresponding connection. Precutover verification of the subscriber number is determined by digital switch 64 by monitoring the communications from RT 46 to COT 42 via cables 44 and 66. After verification and correction, if needed, of the digital switch database, the COT 42, MDF 32, and analog switch 30 may be removed from service upon switch 64 being set to post-cutover operation. A more detailed description of the cutover and testing utilized in the system shown in FIG. 3 is provided by U.S. Pat. No. 4,653,043, which is incorporated by reference herein.

FIG. 4 illustrates the post-cutover system following the conversion illustrated in FIG. 3. Digital switch 70 utilizes a multiplexed channel 72 to provide signaling through RT 74 via analog lines 76 to CPE 78. The illustrated configuration can result from the conversion, as described in FIG. 3 or may represent a new initial installation.

The prior art has failed to provide a solution to the cutover verification of an analog switch utilizing wire subscriber lines directly to a digital switch using integrated digital carrier facilities. Although it is possible to provide an evolution utilizing a COT and an RT as an interim step, this technique is costly in that the COT is retired following conversion to the digital switch and thus, represents additional costs. Further, such a transition requires substantial technician support, especially, in the transition as shown in FIG. 2. Thus, there exists a need to provide an improved pre-cutover verification for a direct conversion from an analog switch using wire lines to a digital switch using an integrated digital carrier system and a multiplexed channel.

SUMMARY OF THE INVENTION

The present invention addresses an improved solution to the problem of cutover verification testing where a new digital switching system is to replace an existing switching system that serves at least a group of subscribers via continuous wire lines. It permits a plurality of existing wire lines to be concurrently connected to channel units associated with the new switching system without adversely impacting the existing service and automatic testing under the control of the new system.

In accordance with the present invention, a direct transition is now facilitated from an existing analog switch (ES) using wire line to a digital switch (DS) using integrated SLC without a previously required interim transition of the ES to universal SLC using a central office terminal (COT) and remote terminal (RT). Specifically, it solves the cutover testing problem by allowing improved channel units (CUs) associated with the DS to be connected to the existing subscriber wire line without impairing the existing service. Prior art CUs would have caused a service disruption because the battery normally supplied by the prior CUs would be connected in parallel with the battery supplied by the ES. The battery supplied by the improved CU can be inhibited by control signaling from the DS thus allowing CU connection to a subscriber line without service disruption.

Following cutover testing of the subscriber lines, the improved CU's battery can be remotely restored, thereby supplying battery to the subscriber lines. In the bridge tap embodiment of the present invention, the line to the ES can also be remotely disconnected. Otherwise the lines connecting the subscriber equipment to the ES can be cut or disconnected at the central office.

Another aspect of the invention permits the DS to conduct a single pre-cutover line verification test procedure regardless of whether the line to be tested is supported by an ES with wire line or by universal SLC. This eliminates having to correlate the DS's directory number database according to the type of transmission path used by the ES.

DETAILED DESCRIPTION

Figure 5:
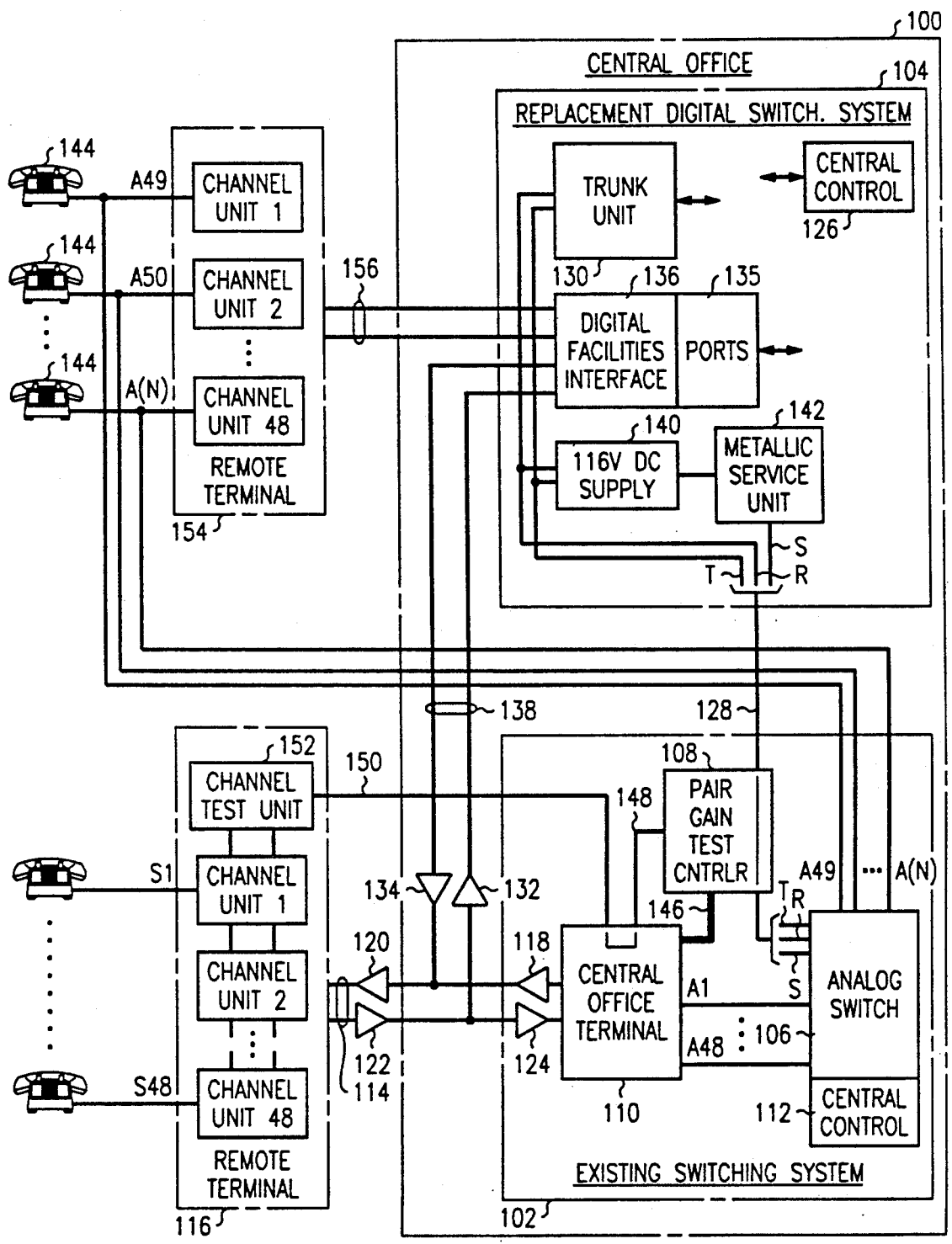
FIG. 5 is a block diagram illustrating a general switching system in accordance with the present invention which accommodates pre-cutover verification testing prior to transferring service to a digital switching system either directly from an analog switch utilizing wire lines or from an analog switch utilizing a digital transmission system.

FIG. 5 is a diagram of a switching system in accordance with the present invention in which central office 100 includes an existing switching system 102 which is to be at least partially replaced by digital switching system 104. In the illustrative embodiment, existing switch system 102 includes an analog switch 106, such as described in the *Bell System Technical Journal* of September 1964. A digital switching system 104 such as disclosed in U.S. Pat. No. 4,322,843 is the replacement service provider. These documents are incorporated herein by reference. The existing switch system 102 includes a pair gain test controller 108, a central office terminal 110, and a central control mechanism 112 for controlling analog switch 106. Mechansim 112 preferably includes a microprocessor computing system that functions pursuant to a series of programs to control the switch operations. The COT 110 supports 48 analog subscriber lines A1-A48 connected to analog switch 106. The COT 110 multiplexes the information on analog lines A1-A48 and provides a SLC digital facility which communicates over digital channel 114, such as a T1 channel, with remote terminal 116. The RT 116, normally located near analog subscriber lines S1-S48, demultiplexes the information received on channel 114, provides analog information, and controls the subscriber lines. The RT 116 transmits over channel 114 to the COT 110 information originated by the subscribers on lines S1-S48 and line status information, such as on-hook and off-hook. Amplifiers 118, 120, 122, and 124 are utilized to amplify the signals transmitted over digital channel 114. The RT 116 includes channel units CU1-CU48 which correspond to the subscriber lines S1-S48 and provide an analog interface, supply battery, and signaling with regard to the subscriber lines.

The replacement digital switching system 104 includes a central control mechanism 126, which functions under the control of a microprocessor to implement control instructions for the system 104, including utilization of a translation database that matches directory numbers with communication ports 135 of digital facilities interface (DFI) 136. An OTO trunk 128 including tip (T), ring (R), and sleeve (S) paths is connected to the trunk unit 130 of system 104 and through a pair gain test controller 108 to analog switch 106. Channel 114 is bridged by amplifiers 132 and 134, which are coupled to DFI 136 via channel 138. This permits the DFI to monitor transmissions from RT 116 to COT 110 and, following the completion of the cutover, provides for transmission from the DFI over channels 138 and 114 to RT 116. A 116 v DC supply 140 and a metallic services unit (MSU) 142 are utilized to provide signaling over the OTO trunk 128 in accordance with the test procedure described below.

Analog switch 106 also supports direct metallic analog lines A49–A(N) which are connected to corresponding CPE 144. Thus, analog switch 106 supports subscribers using conventional metallic lines and through a digital service channel 114.

There exists a method described in U.S. Pat. No. 4,653,043 incorporated herein by reference, by which pre-cutover testing can be used to verify the accuracy of the wiring and the translation database of digital switching system 104 before transferring service from the existing switch system 102 for subscriber lines S1–S48. Generally, in accordance with this method, central control 126 accesses its translation database and determines the directory number defined as being associated with a port 135 that corresponds to subscriber line S1. Trunk 128 is seized by applying a negative, high-current condition to the sleeve conductor of trunk 128 by MSU 142. Trunk unit 130 connects a bridge resistor between the tip and ring conductors of trunk 128. The trunk unit 130 transmits the directory number over trunk 128 to analog switch 106. The central control 112 responds to the received directory number by utilizing its database to determine the corresponding subscriber line associated with the received number. Assume, for purposes of this example, that analog line A1 corresponds to the received number. Analog switch 106 responds by establishing a metallic path from trunk 128 to line A1. MSU 142 applies a negative low-current command condition to the sleeve conductor of trunk 128 for the pair gain test controller 108, and trunk unit 130 removes the bridge resistor connected between the tip and ring conductors.

Pair gain test controller 108 communicates directly with COT 110 over bus 146. Metallic line continuity testing utilizes the pair gain test controller 108 and a metallic path including wire path 148 between controller 108 and COT 110, and a metallic path 150 between COT 110 and RT 116. A channel test unit 152, which is coupled to metallic path 150, provides a bus for coupling a selected one of channel units CU1–CU48 for metallic line testing. Conventional channel units suited for use in a SLC system are generally known and described in *AT&T Bell Laboratories Technical Journal*, Volume 63, No. 10, Part 2, December 1984, incorporated herein by reference.

The MSU 142 energizes DC supply 140 to apply a 116 volt DC voltage, utilized as a control signal, between tip and ring conductors of trunk 128. This voltage is transmitted through the metallic path to COT 110 which responds by initiating a handshaking procedure among COT 110, RT 116, and pair gain test controller 108. The COT selects a time slot corresponding to one communication path in channel 114 and transmits a definition of the selected channel to the RT. The COT also transmits a test signal in the selected channel to inform the RT that a test of subscriber line S1 is to be conducted. The RT generates an off-hook condition of subscriber line S1 and, in response to the off-hook condition, transmits an activity message over channel 114 representing the off-hook condition. The activity message functions as a digital signature since it defines subscriber line 1 as the source of the off-hook activity. The DFI 136 maintains an activity register that defines the on-hook/off-hook status of each of subscriber lines S1–S48. The DFI further monitors the activity messages transmitted over channel 114 and updates its activity register accordingly. The DFI responds to the off-hook activity message transmitted by the RT by writing a logic one (representing off-hook) into the bit position of its activity register corresponding to subscriber line S1.

Following the application of the 116 v DC supply signal to the trunk 128, the digital switching system 104 begins periodically reading the bit position corresponding to subscriber line S1 in the activity register of the DFI to detect a change from a logic zero to logic one indicating an on-hook to off-hook change of subscriber line S1. A detection of a logic one indicates that the pre-cutover test of subscriber line S1 has been successfully completed. If a logic one is not detected within a predetermined time, such as 5 seconds, the test of subscriber line 1 is determined to have been unsuccessful, typically indicating either a translation database error or wiring error.

To conclude this test, the MSU 142 de-energizes supply 140 and applies a negative high-current condition to the sleeve conductor of trunk 128. The MSU subsequently opens the sleeve conductor of the trunk which interrupts the test sequence being performed by pair gain test controller 108, thereby causing the test connections that had been completed to be dropped. This test procedure is repeated for each subscriber line.

The digital facilities interface 136 also supports communication with a remote terminal 154 via multiplexed channel 156 which may comprise a T1 facility. The RT 154 includes improved channel units CU1–CU48 which are connected respectively to analog lines A49–A(N) associated with subscriber equipment 144. The channel units in RT 154 provide a capability not provided by known channel units which permits the simultaneous pre-cutover bridging or connection with a plurality of wire lines. The software utilized in conjunction with central control unit 126 of the digital switching system 104 provides additional features in accordance with the present invention which controls the channel units of RT 154 to permit pre-cutover connection and testing. The channel units of RT 154, software improvements associated with central control unit 126, and the pre-cutover testing of the wire lines to be supported by integrated SLC services are described below.

Figure 6:
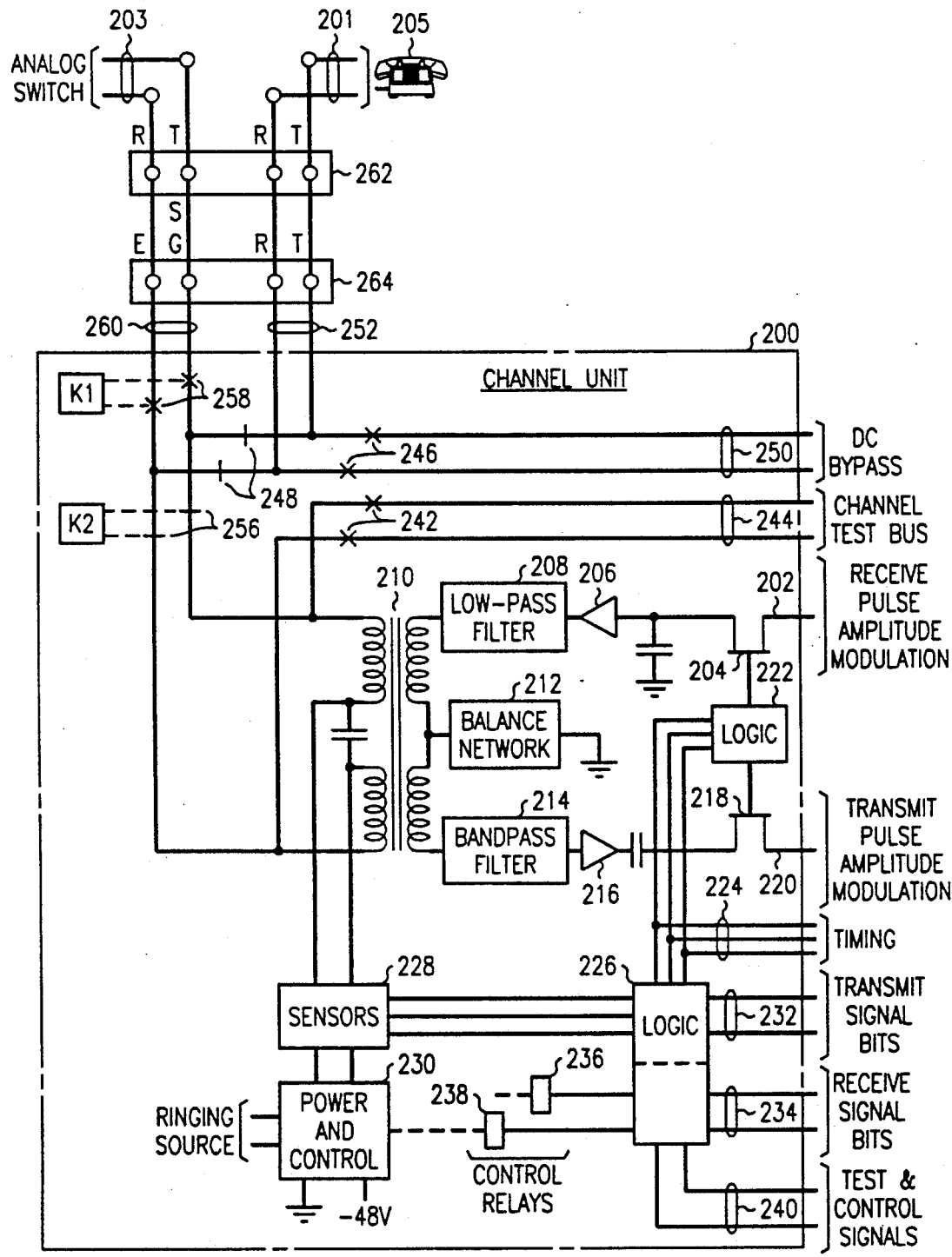
FIG. 6 is a block diagram of a channel unit coupled to an existing service system in accordance with the present invention.

FIG. 6 is a block diagram illustrating an embodiment of a channel unit 200 in accordance with the present invention coupled by means of a bridge tap connection between the wire line 203 connected to the existing analog switch and the wire line 201 connected to the customer premise equipment 205. The analog signals communicated to the CPE 205 by the channel unit 200 are converted from a pulse amplitude modulation (PAM) format, which is transmitted to and received from the remote terminal associated with the channel unit. Received PAM signals on line 202 from the RT are coupled by means of gate 204, amplified by amplifier 206, filtered by low pass filter 208, and applied to hybrid transformer 210, through balance network 212. The hybrid transformer 210 couples the received signals to line 201. Signals originated by the CPE are communicated over line 201 to hybrid 210, are filtered by bandpass filter 214, amplified by amplifier 216, and coupled to transmission line 220 by means of gate 218. Logic circuitry 222 controls gates 204 and 218 to provide corresponding reception and transmission of PAM signals to the RT which translates the PAM signals to PCM signals communicated at an appropriate time slot in the T1 channel utilized by the RT for communications. Lines 224 provide timing information to control logic circuitry 222 and logic circuitry 226. The sensors 228 may consist of off-hook current detectors for dial pulse sensing and ring-trip detectors. Power and control unit 230 supplies battery distributed by the RT to the tip and ring and sensors 228, and applies ringing voltage obtained from the RT to the subscriber tip and ring line. Outputs from sensors 228 provide inputs to logic circuit 226 and are transmitted as signals on lines 232 to the RT. Lines 234 provide signal bits and information to logic 226 which is converted to provide control of relays 236 and 238. Relay 238 provides contact closure control utilized in applying battery and ringing voltage by power and control circuit 230. Relay 236 is utilized to control other contact closures as will be described herein.

Logic circuit 226 converts inputs received from sensors 228 into bits (A and B bits) transmitted on lines 232. The A and B bits comprise a known communication format in which the least significant bit of PAM words are encoded every sixth and twelfth frame to provide control information to and from the CU's. Received A and B bits on lines 234 are converted into control signals by logic 226 and are utilized to control the relays. The timing signals gate the A and B bits in accordance with proper bus time slots.

Make type relay contacts 242 in channel test bus 244 may be activated by relay control function 236 to establish a direct DC test path to tip and ring. During normal operation, relay contacts 242 are open, thereby disconnecting the channel test bus. Make type contacts 246 in series with DC bypass lines 250 and break type contacts 248 in series with tip and ring are operated by control relay function 236 to disconnect the tip and ring function from the remainder of the channel unit and provide a DC continuity path to tip and ring to line 201 for test purposes. The DC bypass lines 250, channel test bus lines 244 and relay contacts 242, 246, and 248 are utilized in conventional channel units to provide the described functions. It should be noted that only a single pair of DC bypass lines exists for communications to the central office switch. Thus, the simultaneous activation of this function on two CU's would result in the corresponding CPE being connected together via the DC bypass line thereby impairing service.

Figure 1:
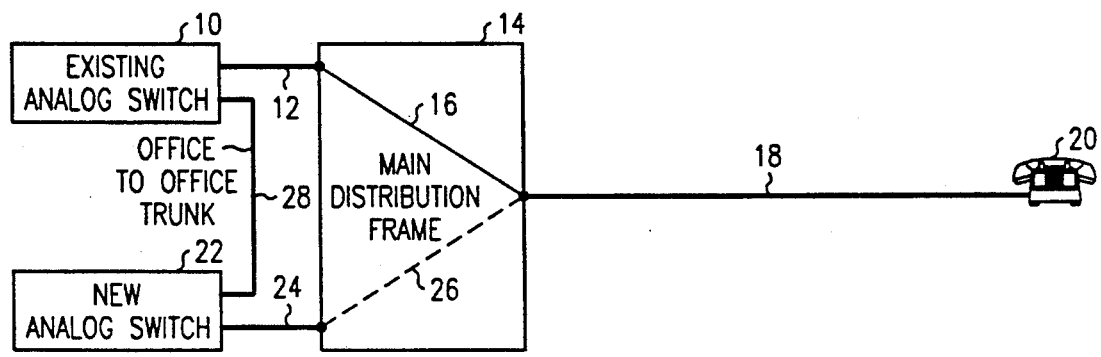
FIG. 1 is a block diagram of an analog switch system illustrating a conversion to a different analog switch system.
Figure 2:
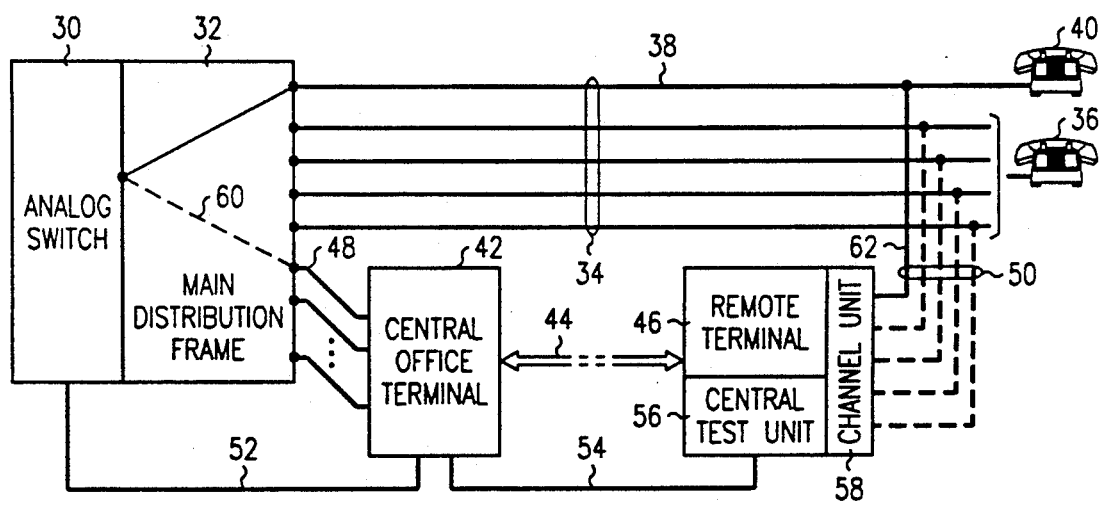
FIG. 2 is a block diagram illustrating a transition from an analog switch utilizing wire lines to a digital transmission system replacing at least some of the wire lines.
Figure 3:
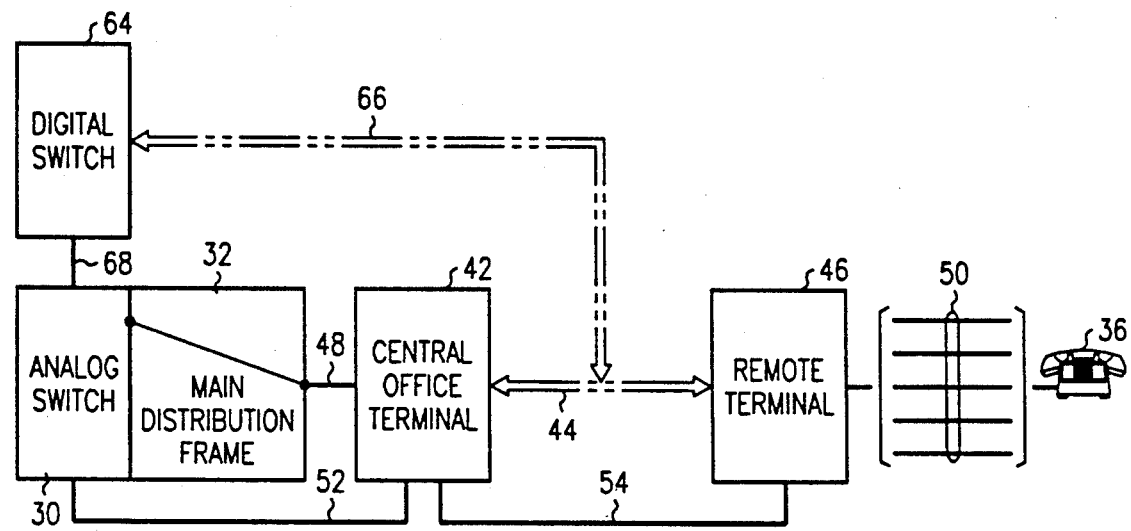
FIG. 3 is a block diagram illustrating conversion from an analog switch utilizing a universal subscriber loop carrier system to a digital switch utilizing an integrated digital carrier system.
Figure 4:
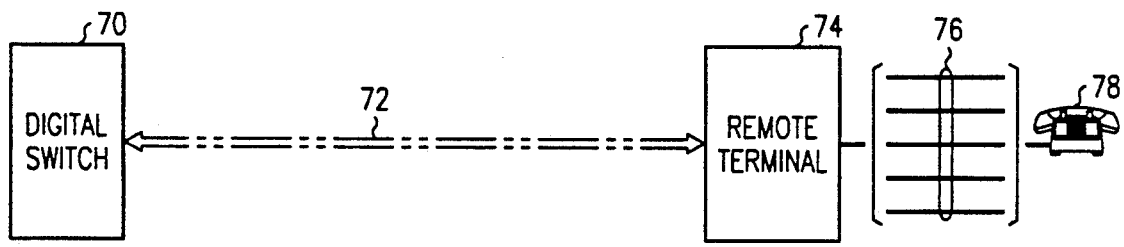
FIG. 4 is a block diagram illustrating a digital switch using an integrated carrier loop system in which wire lines exist only to connect the subscriber equipment to the remote terminal.

In order to appreciate the advantage of the present invention, a brief description of the cutover of service to conventional channel units follows. In a conventional CU, tip and ring lines 252 are connected to line 203 and to subscriber line 201 with a Y-splice connection. Prior to the Y-splice connection, the channel unit is conditioned by activating the DC bypass relay, causing break contacts 248 to open, thereby isolating the channel unit from lines 203 and 201. This is required in a conventional CU in order to prevent the subscriber line from receiving battery supply from both the analog switch and the channel unit. Following a successful pre-cutover test verification, a changeover of service is initiated, i.e., the analog wire line 203 is cut and the DC bypass relay is released, causing contacts 248 to close, restoring battery supply to the subscriber line from the power and control unit 230 of the channel unit 200. This response is repeated for each line. This prior art method which is represented in FIG. 2 requires substantial manual labor for the line by line testing and cutover.

Referring to FIG. 6, a relay K2 has break type contacts 256 in series with tip and ring lines 252 and is preferably utilized in combination with another relay K1 having make type contacts 258 in series with lines 260 to provide an improved pre-cutover testing and service change capability for channel units. In accordance with an embodiment of the present invention, a bridge tap is made, segregating lines 203 and subscriber lines 201 as separate lines connected to a frame connection terminal 262. Lines 252 and 260 from the channel unit are connected to frame connection terminal 264, as shown. The frame connection terminals 262 and 264 couple lines 260 with lines 203 and couple lines 252 to lines 201. The relays K1 and K2 control the operation of relay contacts 258 and 256, respectively. The relays are controlled by logic unit 226. Command signals consisting of predetermined states of the A and B bits are utilized to control the operation of the relays in accordance with the present invention.

Different types of conventional channel units have been utilized to provide different types of service, such as single party or POTS (plain old telephone service), SPOTS (super plain old telephone service), and coin-operated pay phone service. The following TABLE illustrates one party, SPOTS, and coin (dial tone first) types of channel units which are supported in accordance with the illustrative embodiment of the present invention. Those skilled in the art will appreciate that other types of CU service can be accommodated by defining associated command signals.

TABLE

| Type | A Bit | B Bit | K1 | K2 | Condition |
|---|---|---|---|---|---|
| 1 party | 1 | 0 | oper | oper | Pre-cut, |
| SPOTS | 1 | 0 | oper | oper | Before Test |
| Coin | 1 | 1 | n/a | oper | |
| 1 party | 0/1 | 0 | oper | rlsd | Pre-cut, |
| SPOTS | 1 | 1 | oper | rlsd | Test In |
| Coin | 0 | 0 | n/a | rlsd | Progress |
| 1 party | 1 | 1 | rlsd | rlsd | Post-cut |
| SPOTS | 0 | 0/1 | rlsd | rlsd | |
| Coin | 0 | 0 | n/a | rlsd | |
| 1 party | X | X | rlsd | rlsd | All Other |
| SPOTS | X | X | rlsd | rlsd | States |
| Coin | X | X | n/a | rlsd | |

The A bit and the B bit may each assume one of three states: 1, 0, 0/1 (alternating). For each exemplary type of channel unit identified, different A-B bit combinations correspond to the states of pre-cut before test; pre-cut, test in progress; post-cut. The K1 and K2 relays assume a released or non-energized condition for all other possible states for the three types of channel units. In the TABLE: 'oper' indicates a relay is operated or energized; 'rlsd' means released, or unenergized; n/a means not applicable; 'x' means all other states.

Before describing the different operational states for the different types of channel units, it is important to note that relay K1 and the corresponding make type contacts 258 provide a bridge tap release function. That is, in the post-cutover condition, relay K1 causes contacts 258 to be open, thereby disconnecting wire lines 203; subscriber lines 201 are connected to the channel unit via lines 252 and through contacts 248 and 256. Thus, the channel unit assures service to the CPE 205 through wires 252 and 201. Even if the connection of lines 203 is severed at the central office, the transmission line loading factor provided by a connection of line 203 in parallel across the active subscriber service line can provide undesired characteristics. In the illustrative embodiment, relay K1 and contacts 258 are utilized in the post-cutover condition to remove this transmission line load for one party and SPOTS type channel units. In the illustrative embodiment, it has been determined that for coin type channel unit service the effect of the transmission line loading is not sufficient to justify the utilization of relay K1, and hence, relay K1 and contacts 258 are not utilized for coin type channel units. This condition would be illustrated in FIG. 6 if make type contacts 258 were each replaced with a short circuit. Thus, unless analog line 203 is manually removed, a transmission line loading effect will be present during coin type channel unit operation.

In the following description of the operation of the illustrative embodiment, it should be understood that for the coin type channel unit only relay K2 is utilized and hence, reference to the operation of relay K1 is not applicable to that unit, but is applicable to the other units. In the pre-cut, before test condition, relays K1 and K2 are operated, i.e., contacts 256 are open and contacts 258 are closed. This effectively isolates the channel unit and provides connection from subscriber line 201 to corresponding analog switch line 203. In this condition, conventional service from the analog switch continues to be provided to the customer.

In the pre-cut, test in progress condition, relay K1 is operated and relay K2 is released, i.e., contacts 256 and 258 are closed. This connects analog line 203, subscriber line 201, and the channel unit tip and ring lines together. Prior to entering this condition, the new digital switch will have signaled the existing analog switch causing the analog line 203 to be placed in a test condition with supply battery removed, thus, preventing what would have been the undesired situation of the subscriber line 201 receiving battery from both the analog switch and the channel unit. A metallic path is established during the test from line 203 through the analog switch and an OTO trunk connecting the analog switch to the digital switch so that the digital switch can monitor and test conditions on the line.

In the post-cut condition, both relays K1 and K2 are released, i.e., contacts 256 are closed and contacts 258 are open, thereby connecting subscriber line 201 to the channel unit and disconnecting analog switch line 203 at contacts 258. This accomplishes what is referred to as a bridge tap removal for one party and SPOTS CU's. In this post-cut condition the channel unit and the new digital switch provide service to the subscriber over line 201.

In all other states, relays K1 and K2 are released which comprise the same state as in the post-cut condition. Thus, the A and B signaling bits can be utilized to control additional functions of the channel units by using other codes without disturbing the operational post-cut mode. The relay K2 and its control in accord with the present invention provide a means for inhibiting the supply of battery from the CU to a connected subscriber line.

Figure 7:
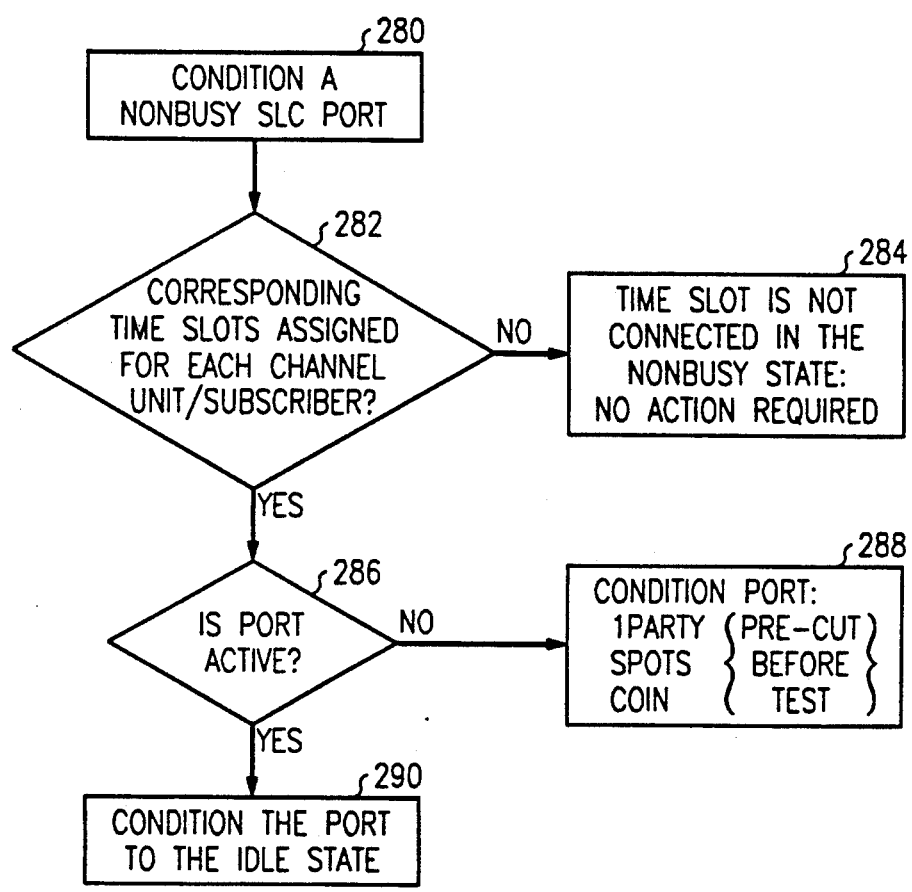
FIG. 7 is a flow diagram illustrating port conditioning in accordance with the present invention.

Referring to FIG. 7, a method which is supported by the central control unit 126 of the new digital switching system conditions channel units installed in remote terminal 154. As indicated in step 280, a mpmbusy SLC port 135 which corresponds to a channel unit is set to idle upon initial installation and prior to testing. In step 282 a determination is made if corresponding time slots are assigned for each channel unit (subscriber) in the new digital switching system. A NO determination indicates that time slots are assigned for a channel unit/subscriber only upon demand for service. This condition indicates that time slots are not permanently assigned and are, hence, not available to carry A and B control bit commands to the corresponding channel units. Hence, no action is required, as indicated at step 284.

A YES determination by step 282 results in a further determination at step 286 as to whether the port is active. A NO determination causes step 288 to condition the one party, SPOTS and coin channel units to be set to the pre-cut, before test condition. In this condition, the A and B bit patterns are transmitted, thereby causing relays K1 and K2 to both be energized. The result is to maintain connection of the subscriber to lines 203 with the new channel unit being disconnected to prevent the application of ground and battery to tip and ring from the channel unit. Upon a YES determination at step 286, the port 135 at the integrated SLC and the corresponding CU at the RT are placed in the idle state. This state corresponds to the post-cut state indicated in the TABLE. The A/B bit pattern is transmitted thereby causing relays K1 and K2 to both be released, which connects the subscriber to the channel unit and disconnects the previously existing line from the old office. In this condition, the subscriber is provided service by the new digital switch facility utilizing integrated SLC by means of the connected remote terminal and corresponding channel unit. This port conditioning is normally periodically repeated in accordance with the central control and provides proper control of existing and new channel units. The conditioning of the channel units from the condition indicated at step 288 to the pre-cut, test in progress state, as shown in the TABLE occurs under control of the test implementing method and software prior to the number testing.

Figure 8:
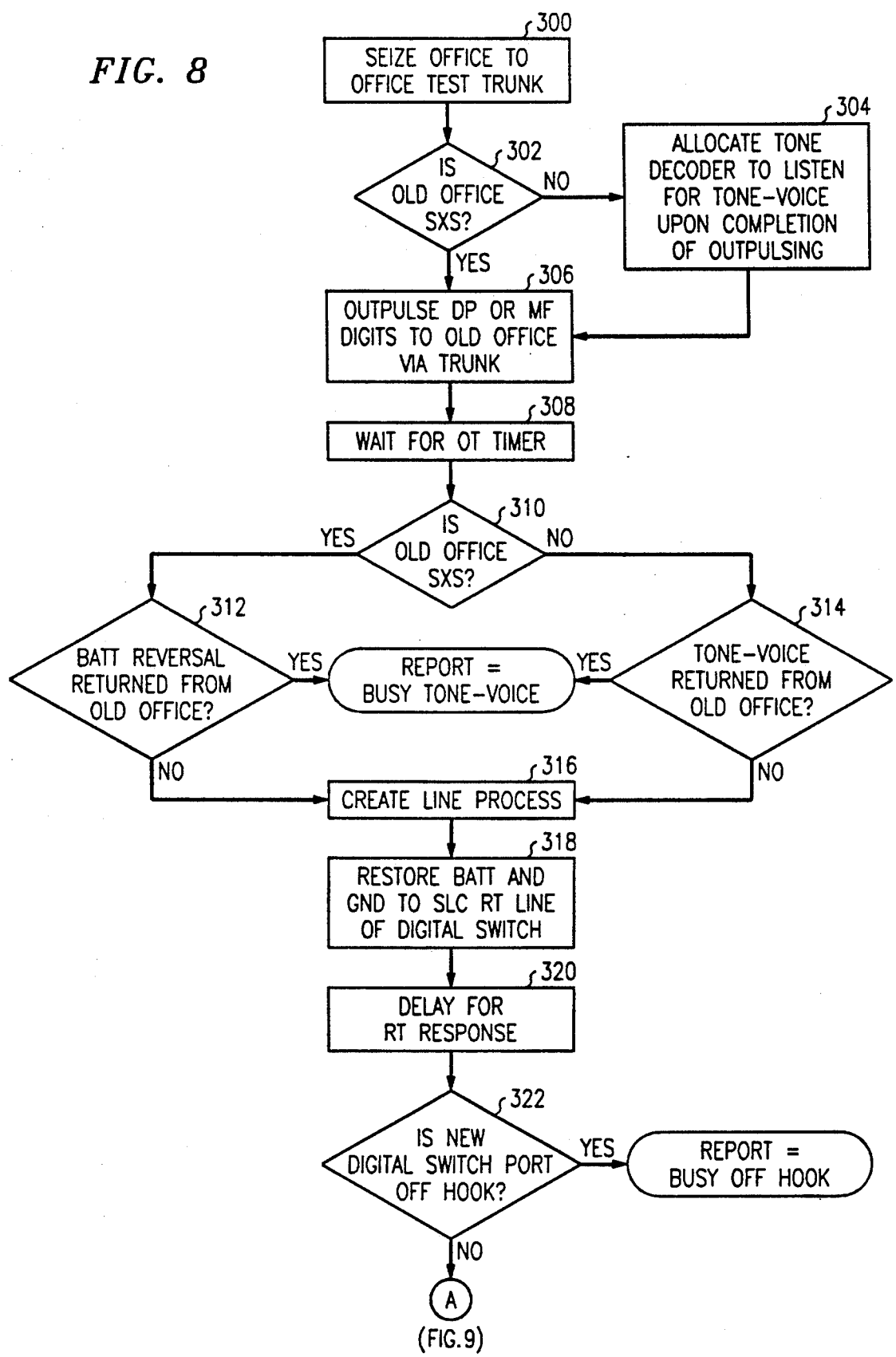
FIGS. 8 and 9 illustrate an exemplary flow diagram of cutover system testing in accordance with the present invention.
Figure 9:
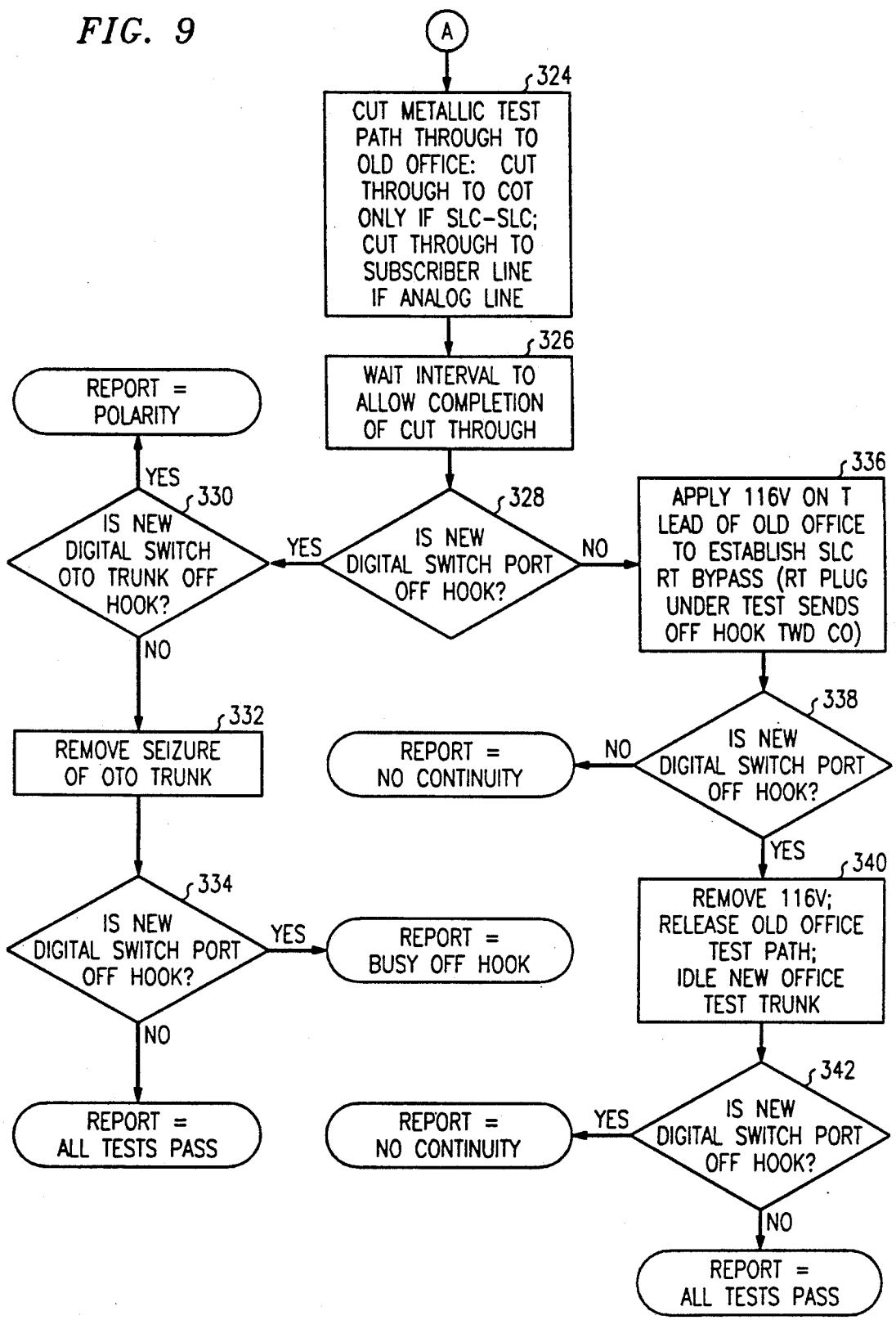

FIGS. 8 and 9 together form a flow diagram illustrating any exemplary method in accordance with the present invention. This method permits direct precutover testing of wire lines from an existing analog switch to a new digital switch utilizing integrated SLC communications. A further feature of the illustrated method permits pre-cutover testing of an existing analog office which may utilize direct wire line support or universal SLC communication, or both to a new digital office utilizing integrated SLC communications. The illustrative test method does not require prior knowledge of which of these types of service is utilized in order to provide pre-cutover testing.

Referring to FIG. 8, the method is initiated by the seizure of the OTO test trunk by the new digital switch at step 300. This is typically initiated by the new switch providing a high current on the sleeve lead and the placing of a resistive bridge across the trunk tip and ring. At determination step 302 a decision is made if the existing analog office is a step-by-step (SXS) office. If NO, a tone decoder is allocated at step 304 to listen for tone or voice upon completion of the outpulsing of the number from the new office to the old office. Upon a YES determination at step 302, the new office transfers the number from its translation database associated with the subscriber line to be tested by either dial pulsing or sending multifrequency tones representing digits to the old office via the OTO trunk at step 306. At step 308 an outpulse timer waits for a predetermined period of time to permit the completion of the outpulsing from step 306. A determination is made in step 310 if the old office is a step-by-step office. If YES, another decision at step 312 is made to determine if a battery reversal was returned from the old office. A battery reversal would indicate an off-hook or busy condition. A YES decision at step 312 results in a "REPORT" of busy tone-voice. In the present flow diagram, a REPORT indicates a conclusion of testing for the specific number under test and the subject of the REPORT provides an indication of the reason for the conclusion of testing. In this case, the subscriber identified by the particular number under test was off-hook indicating the subscriber line was in use. Since the testing strives not to disrupt ongoing service, the test concludes. As is known, this number can be added to a listing of busy numbers which can be tested later automatically in accordance with a retest program.

A NO determination at step 310 leads to a further determination at step 314 as to whether tone-voice detection was returned from the old office. A YES determination at step 314 again results in a REPORT of busy tone-voice. A NO determination at step 314 or a NO determination at step 312 causes a creation of a line process as indicated at step 316. The line process is a known software method by which a particular port associated with the DFI is identified for use. In this testing mode, a port at the new digital switch is identified and corresponding hardware made ready for use in connection with the number under test. A corresponding channel unit at the remote terminal associated with the new digital switch is also activated for testing and communications.

In step 318 battery and ground are restored to the channel unit at the SLC remote terminal associated with the new digital switch. It should be noted that the battery and ground at the channel units will have been set during preconditioning during installation to be in the pre-cut before test mode, in which the battery and ground available to be sourced from the channel unit is disconnected. If the number under test is associated with a universal SLC communication link at the old office, the communication consisting of the transmission of A/B bits by step 318 will be ineffective since digital transmission by the new switch to a universal SLC link is not permitted in the test mode; the new digital switch is only permitted to receive or monitor transmissions from the RT to the COT.

In step 320 a delay is provided to allow for response time from the RT in response to step 318. A determination is made in step 322 if the new digital switch port is off-hook. If YES, a REPORT of busy off-hook is made. If the subject number at the old office is supported by wire, this indicates either busy or a short, i.e., a problem. If the number utilized at the old office is supported by universal SLC, this REPORT is indicative of a busy condition. Upon a NO determination at step 322 the new digital office causes a metallic test path to be cut through to the existing office line associated with the number under test. This may be accomplished by applying a low current to the sleeve lead of the OTO trunk. If the subject number is supported at the old office by universal SLC service, this metallic cut-through will only provide a path to the COT, i.e., a metallic path to the corresponding RT will not be established. If the number at the existing office is supported by wire line, the metallic test path will be cut through to the subscriber line as indicated by step 324. In step 326 the method waits for a predetermined time interval to allow completion of the cut-through.

A decision is made in step 328 if the new digital switch port is off-hook. A YES determination would normally indicate a customer off-hook if the old office is universal SLC. A YES determination would be the expected response if the old office is wired because a complete metallic cut-through to the subscriber line would have occurred in step 324 causing the OTO trunk test to cause the off-hook condition. In step 330 a determination is made if the new digital switch OTO trunk is off-hook. A YES response to step 330 will result in a REPORT of polarity. This indicates an unexpected response and a possible problem. A NO determination by step 330 causes the new digital switch to remove seizure of the OTO trunk in step 332. A determination is made in step 334 if the new digital switch port is off-hook. A YES determination at step 334 results in a REPORT of busy off-hook, indicating that the likely cause of this decision is an off-hook condition by the subscriber. A NO determination at step 334 results in a REPORT of all tests passed (ATP). The ATP REPORT not only concludes the testing associated with the subject number, but also provides an indication of a successful pre-cut test verification of the subject number. The NO determination by step 334 would indicate a successful pre-cut test and would further indicate that the subject number was supported by a wire line from the existing office. It should be noted that the removal of the seizure at step 332 gives rise to a NO decision at step 334 and that the same determination yielded a YES determination at step 328. This, in effect, is confirmation that the off-hook condition was due to the test being conducted, as opposed to an off-hook generated by the subscriber.

A NO determination at step 328 is an expected condition if the number under test is supported by a universal SLC office. It constitutes an unexpected decision if the number associated with the old office is supported by wire and would normally indicate a continuity problem which will be resolved by the remaining tests. Following a NO determination by step 328, step 336 causes 116 volts DC to be applied on the tip lead of the existing office to establish a DC bypass test condition. This will cause the corresponding channel unit at the RT in communication with the universal SLC to send an off-hook signal to the COT. If the number associated at the old office is supported by wire, the application of the 116 volts should invoke no response. In step 338 a decision is made if the new digital switch port is off-hook. A NO determination results in a REPORT of no continuity. A YES determination at step 338 causes step 340 to initiate the removal of the 116 volts and releases the old office test path by applying a high current on the sleeve lead. The new office test trunk is idled. Only a number supported by an old office utilizing universal SLC should arrive at step 340. Following this step, a decision is made at step 342 if the new digital switch port is off-hook. A YES determination results in a REPORT of no continuity. This would be an indication that the previous off-hook determination at step 338 was not caused by the bypass test. A NO determination at step 342 results in a REPORT of all tests passed. This is an indication that the previous off-hook determination at step 338 was caused by the bypass test, and hence, verifies the correct operation and correspondence of the number at the new digital switch with the same number at the old digital switch which is supported by a universal SLC.

All exits, i.e., REPORTS, in the illustrative flow diagram will cause removal of the 116 volt DC test if applied, release the old office test path if initiated, will idle the new office test trunk and condition the new digital office channel unit to the pre-cut, before test condition.

The above describes the testing of a number for a subscriber for which service is to be cut-over from an existing office using either wire or universal SLC to a new digital office utilizing integrated SLC. It will be noted that the above test method requires no prior knowledge nor information to be utilized at the new digital switch to distinguish whether the number at the old office is supported by wire or universal SLC. This provides an advantage in that extensive pre-cross checking or verification of the type of service provided by the existing office is not required in order to conduct a successful cutover test.

It is contemplated that a plurality of subscriber numbers may be automatically tested in accordance with the above method under control of a conventional cutover test program. Generally, testing involves utilizing a preprogrammed set of numbers at the new digital switch which are sequentially utilized in the above test method for a determination of proper operation or a problem indication. An off-hook busy determination will typically result in the number being placed upon a "busy" listing of numbers which will be either automatically retried in accordance with the test method or manually checked.

Figure 10:
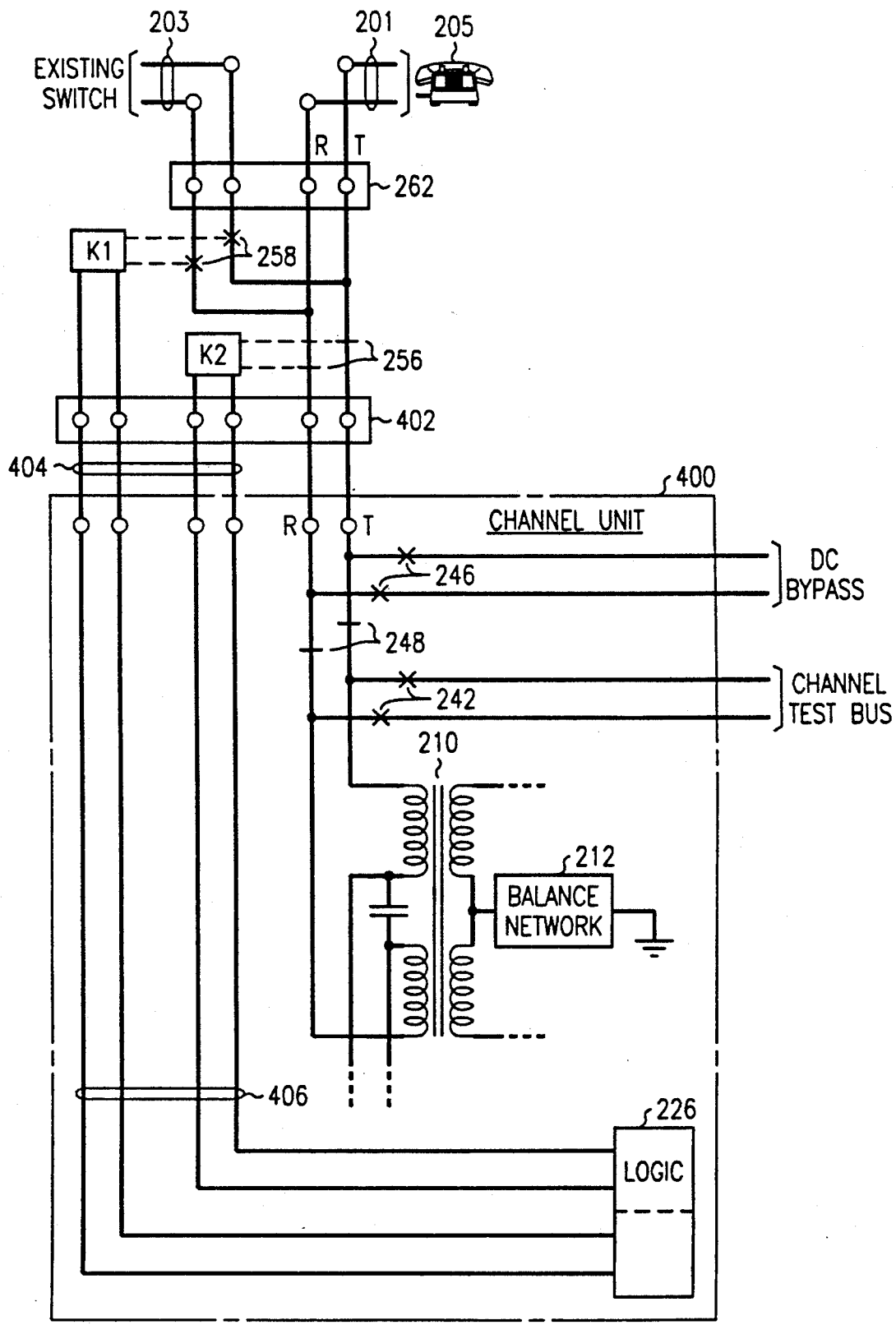
FIG. 10 is a block diagram of another embodiment of a channel unit in accordance with the present invention.

FIG. 10 illustrates an alternative embodiment of a channel unit 400 which is identical to channel unit 200 with the following exceptions. Relays K1 and K2 and the corresponding contacts 258 and 256 have been located external of the channel unit on connection block 402. Normally closed relay contacts 256 are placed in series between tip and ring subscriber line 201 and the tip and ring input to the channel unit. Normally open relay contacts 258 are disposed in series with line 203. The relays K1 and K2 and the associated contacts 258 and 256, respectively, perform the same function as described with regard to channel unit 200. Logic circuit 226 provides relay control signals in response to received A/B bit commands to control relays K1 and K2 via internal lines 406 and external lines 404. External control lines 404 are coupled to the coils of relays K1 and K2. Logic circuit 226 functions identical to the logic circuit previously described with regard to channel unit 200. The external use of relays K1 and K2 permits channel units 400 to be manufactured without the costs associated with incorporating relays K1 and K2. This makes the CU more flexible and permits it to remain in operation after cutover testing without a cost penalty. After testing, the relays K1 and K2 can be removed and used at another site to be cutover.

It will be apparent to those skilled in the art that a plurality of terminal strips 402 and associated relays K1 and K2 could be mounted in a separate unit utilized in combination with the channel units 400. Such separate relay units could be removed after successful pre-cutover testing and utilized at another switch replacement site.

Figure 11:
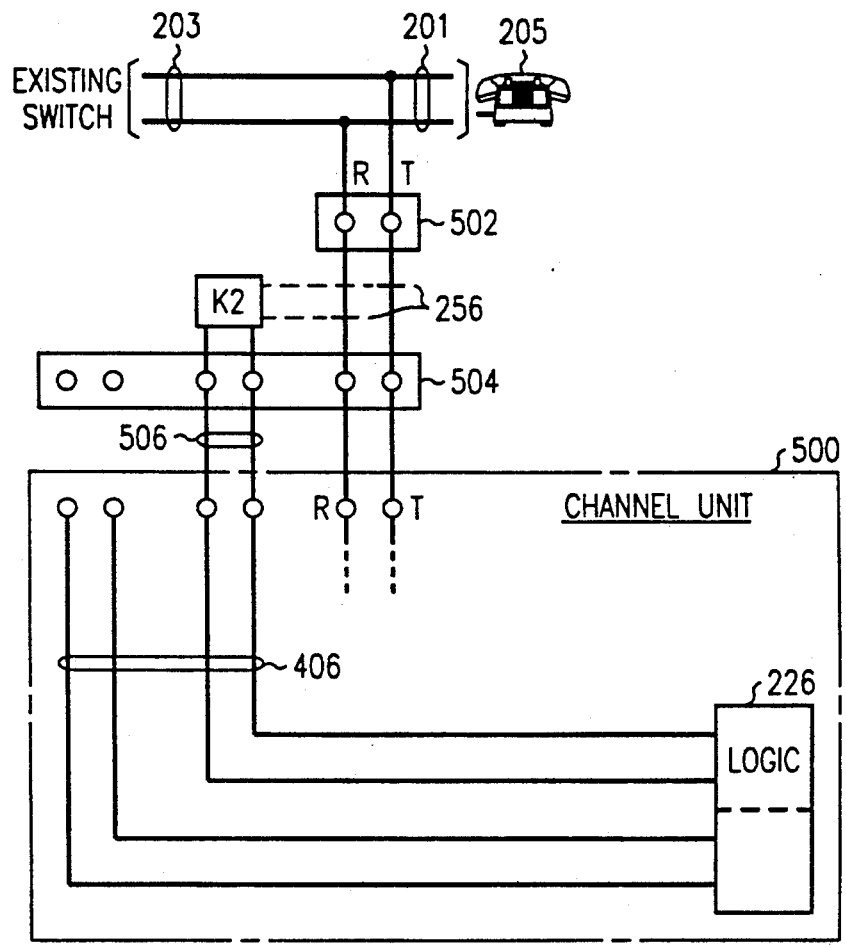
FIG. 11 is a block diagram of a further embodiment of a channel unit in accordance with the present invention.

FIG. 11 is a block diagram of a further embodiment in accordance with the present invention which utilizes a Y splice instead of a bridge tap connection. Channel unit 500 is identical to channel unit 400. A Y spliced connection is made to lines 201 and 203 via terminal block 502. The tip and ring wires are coupled through block 502, through normally closed relay contacts 256 associated with relay K2 to relay block 504 and to the tip and ring input terminals of channel unit 500. Relay K2 and its associated contacts function identically to the prior description of channel unit 400 and channel unit 200. Because a bridge tap connection was not utilized, relay K1 is not required. Leads 506 connect the coil of relay K2 to the control lines coupled to logic circuit 226. This embodiment economically addresses a connection in which a bridge tap is not required.

The embodiments shown in FIGS. 10 and 11 are controlled by the same method and signaling described with regard to the embodiment of FIG. 6. The embodiments shown in FIGS. 6, 10, and 11 all share the common capability of receiving control signals via the COT and RT which are utilized to selectively control relays K1 and K2 to permit the concurrent connection of a plurality of subscriber lines to associated channel units without adversely impacting service to the customer. At the conclusion of testing, the customer line is connected via contacts 256 under the control of relay K2 to the channel unit completing the transition of service to the new digital switch from the existing switch.

Although the illustrative embodiments have used relays K1 and K2 to control the transmission of signals, other types of controllable impedance devices such as solid state devices and circuitry could be utilized to perform the functions. The CUs could be configured to not provide battery to an associated subscriber line, except upon receipt of a command signal from the new digital switch system, thereby eliminating the need for initialization after installation in an RT to inhibit the CU battery.

The contacts 258 and 256 of relays K1 and K2 could be selected to be of the opposite type, i.e., normally open versus normally closed and normally closed versus normally open. In this case, the operated/released states in the TABLE would also be reversed. Where a bridge tap embodiment is used, this reversed configuration offers the advantage of not disrupting the existing service if the power to the CU or associated RT is interrupted. Also, it may be desirable to locate the higher power relay drivers external to the CU along with externally located relays K1 and K2 so that logic circuit 226 need only supply low level control signals.

Although embodiments of the present invention and methods utilized in accordance therewith have been described and illustrated in the drawings, the scope of the present invention is defined by the following claims.

We claim:

1. A system for testing the operation of a digital switching (DS) system prior to the DS system assuming service responsibility for customer premises equipment (CPE) being served by an existing switch (ES) system with metallic subscriber lines connecting said CPE and the ES system, said DS system including a digital facility interface (DFI), a remote terminal (RT) and a multiplexed communication channel connecting said DFI and RT, said DS and ES systems each storing translation data defining the association of directory numbers with said subscriber lines, said RT including a plurality of channel unit (CU) means for interfacing said subscriber lines with the RT, said CU means including at least one terminal set to facilitate subscriber line connection to the CU means and means associated with said CU means for supplying battery to said subscriber lines, said system for testing comprising:

said CU means including first switch means for selectably connecting and disconnecting at least said battery supplying means to said terminal set;

means for controlling said switch means with control signals transmitted by said DS system and carried by said multiplexed communication channel so said battery supplying means is disconnected from said terminal set prior to connection of a subscriber line to said terminal set;

means associated with said DS system for transmitting a directory number that corresponds to one subscriber line to said ES system;

means for establishing communication between said DFI through said RT with the CU means connected to said one subscriber line, said CU means transmitting status signals to said DFI corresponding to the status of said one subscriber line;

said controlling means causing said switch means to connect said battery supplying means to said terminal set;

means for establishing a metallic test circuit through said ES system to a selected subscriber line associated with said directory number received from said DS system;

means for comparing the status of said one subscriber line as indicated by said status signals and the state of said metallic test circuit in order to verify that the number used by the DS and ES systems reach the same subscriber line.

2. The system for testing according to claim 1 wherein said first switch means comprises a relay with contacts disposed in series between said battery supplying means and said one terminal set.

3. The system for testing according to claim 1 wherein said control signals comprise control bits with predetermined first and second states which define commands to said first switch means corresponding to the connection and disconnection, respectively, of said battery supplying means to said terminal set.

4. The system for testing according to claim 1 wherein said test circuit establishing means comprises an office-to-office trunk disposed between said DS and ES systems.

5. The system for testing according to claim 1 wherein said comparing means comprises microprocessor means under the operative control of a cutover test program for comparing the status of said one subscriber line as defined by said status signals and the state of said metallic test circuit.

6. The system for testing according to claim 1 wherein said controlling means causes said first switch means to disconnect said battery supplying means from said terminal set after completion of the comparison by said comparing means.

7. The system for testing according to claim 6 further comprising means for discontinuing said metallic test circuit following a comparison by said comparing means.

8. The system for testing according to claim 1 wherein said CU means comprises another terminal set, said one subscriber line being severed between said ES system and said CPE to define a first line connected to said ES system and a second line connected to said CPE, said second line being connected to said one terminal set and said first line being connected to said another terminal set.

9. The system for testing according to claim 8 wherein said CU means further comprises a second switch means for selectively connecting and disconnecting said first line with said second line.

10. The system for testing according to claim 9 wherein said controlling means controls said first and second switching means by said control signals carried over said multiplexed communication path.

11. The system for testing according to claim 10 further comprising microprocessor means under the operative control of a cutover program for initiating a cutover of service from said ES system to said DS system for lines previously verified in accordance with said comparing means, said controlling means causing said first switch means to connect said battery supplying means to said one terminal set and said second switching means to disconnect said first line, thereby providing service to the CPE associated with said CU means and removing the said first line, thereby preventing said first line from consituting an undesired load.

12. A system for testing the operation of a digital switching (DS) system prior to the DS system assuming service responsibility for customer premises equipment (CPE) being served by an existing switch (ES) system with a first group of CPE connected only by metallic subscriber lines, said DS system including a digital facility interface (DFI), a remote terminal (RT) and a multiplexed communication channel connecting said DFI and RT, said DS and ES systems each storing translation data defining the association of directory numbers with said subscriber lines, said testing system including means for interfacing said subscriber lines with the RT, said interfacing means including means for supplying battery to a connected subscriber line, said system for testing comprising:

control means for remotely connecting and disconnecting said battery supplying means relative to a subscriber line connected to said interface means;

means for concurrently coupling a plurality of said metallic subscriber lines associated with said first group to corresponding interfacing means, said control means disconnecting said battery supplying means prior to said coupling of the subscriber line;

means for establishing a connection from said DS system via said DFI, multiplexed communication channel and RT to one subscriber line associated with one directory number;

means under the control of said DS system for causing said ES system to establish a test path to a trial subscriber line associated with said one directory number;

comparison means under the control of said DS system for determining if a status condition change made to one of said trial subscriber line and said subscriber line results in a corresponding status change on the other of said line, said status condition change indicating whether the directory number used by the DS and ES systems reach the same subscriber line.

13. The system for testing according to claim 12 wherein said causing means comprises means for establishing an office-to-office (OTO) trunk between said DS system and said ES system.

14. The system for testing according to claim 13 further comprising means under the control of the DS system for effecting a change of state of said trial subscriber line by said OTO trunk.

15. The system for testing according to claim 12 wherein said control means causes said battery supplying means to become connected prior to the determination made by said comparison means.

16. The system for testing according to claim 12 wherein said control means comprises a relay with contacts disposed in series between said battery supplying means and associated subscriber line.

17. The test system according to claim 12 wherein said control means includes signals transmitted from said DFI over said multiplexed communication channel.

18. A system for testing the operation of a digital switching (DS) system prior to the DS system assuming service responsibility for customer premises equipment (CPE) being served by an existing switch (ES) system with a first group of CPE connected only by metallic subscriber lines and a second group of CPE served by subscriber lines linked to said ES system using a first multiplexed channel, said DS system including a digital facility interface (DFI), a remote terminal (RT) and a second multiplexed channel connecting said DFI and RT, said DS and ES systems each storing translation data defining the association of directory numbers with said subscriber lines, said RT including a plurality of channel unit (CU) means for interfacing said metallic subscriber lines with the RT, said CU means including means for supplying battery to a connected subscriber line, said system for testing comprising:
    means associated with said DS system for storing a plurality of directory numbers to be tested, said DS system not having information to distinguish whether a directory number to be tested is associated with said first group or said second group;
    means for coupling said DFI to said second group via said first channel and coupling said RT via said CU means to a plurality of metallic subscriber lines associated with said first group;
    means for selecting a port associated with said DFI that corresponds to said selected directory number;
    office-to-office (OTO) trunk means under the control of said DS system for establishing via said ES system a test path to a first subscriber line associated with a selected directory number received from said DS system;
    means under the control of said DS system for automatically making a sequence of comparisons based on the state of said test path and the state of said port;
    means responsive to said comparisons for deciding if said selected directory number used by the DS and ES systems reach the same subscriber line.

19. The system for testing according to claim 18 wherein said comparison making means comprises microprocessor means operatively controlled by a cutover test program for generating commands which cause a change of state on one of said test path and said port, and monitoring the state of the other port for a corresponding change.

20. The system for testing according to claim 19 wherein said test program causes said microprocessor means to effect a predetermined sequence of command generation and state monitoring for subscriber lines in said first and second groups.

21. The system for testing according to claim 18 further comprising a first switch means for selectively connecting and disconnecting at least said battery supply means relative to a connected subscriber line associated with said first group.

22. The system for testing according to claim 21 wherein said first switch means comprises a relay with contacts disposed in series between said battery supplying means and said connected subscriber line.

23. The system for testing according to claim 21 further comprising means for controlling said switch means by control signals transmitted by said DFI via said second multiplexed communication channel.

24. The system for testing according to claim 23 wherein said controlling means utilizes said control signals to disconnect said battery supply means prior to initial connection of a subscriber line.

25. In a digital switching (DS) system including a digital facility interface (DFI) for communicating with a remote terminal (RT) over a multiplexed communication channel, means for storing translation data defining the association of directory numbers with subscriber lines coupled to channel units (CU) which interface subscriber lines to the RT, said subscriber lines being served by an existing switch (ES) system by metallic lines, the improvement comprising:
    means for sending a first predetermined command signal to CU's via said communication channel prior to connection of a subscriber line to the CU's, said first signal defining a command to the CU's to disconnect supply battery;
    means for establishing a first communication link via the multiplexed communication channel and RT to a first subscriber line corresponding to a directory number selected for testing;
    means for causing the ES system to establish a second communication link to a test subscriber line corresponding to said selected directory number, said second link coupled to the DS system to provide the DS system with status information;
    means for receiving signals sent from the RT which correspond to the status of said first subscriber line connected to a CU;
    means for automatically making a sequence of comparisons based on the status of said first subscriber line as determined by said first communication link and the status of said test subscriber line as determined by said second communication link;
    means responsive to said sequence of comparisons for determining if the directory number used by the DS and ES systems reach the same subscriber line.

26. The digital switching system according to claim 25 wherein the multiplexed communication channel comprises a T1 channel and said first command signal comprises a predetermined state of A and B signaling bits utilized with said T1 channel.

27. The digital switching system according to claim 25 wherein said receiving means comprises a port of said DFI associated with said first communication link, and a status register associated with said port which provides at least an indication of off-hook and on-hook conditions of the associated subscriber line.

28. The digital switching system according to claim 25 wherein said causing means comprises an office-to-office trunk connecting said DS and ES systems.

29. The digital switching system according to claim 25 wherein said making means comprises microprocessor means operating under the control of a program for comparing the status of one of said first test subscriber lines relative to a change of status of a corresponding one of said first subscriber lines.

30. The digital switching system according to claim 29 wherein said sending means sends a second predetermined command signal to the CU prior to the making of comparisons by said making means.

31. The digital switching system according to claim 30 wherein said sending means sends said first command signal following the determination by said determining means thereby disconnecting the supply battery from said first subscriber line.

32. A method for testing each of a group of subscriber lines prior to the replacement of an existing switch (ES) system serving said group via metallic lines between said ES system and customer premise equipment (CPE), with a digital switching (DS) system to be cut over to serve said group, the DS system utilizing a digital facilities interface (DFI) that communicates with a remote terminal (RT) over a multiplexed communication channel, the DS and ES system each storing translation data defining the association of directory numbers with the lines in said group, the method comprising the steps of:
prior to coupling said subscriber lines to the RT, inhibiting the CPE supply battery at the RT via a command signal transmitted over the multiplexed communication channel so that battery is not supplied to the subscriber lines on initial connection to the RT;
said DS system transmitting one directory number corresponding to one line of said group to said ES system;
said DS system establishing a communication path to said one line via said DFI and RT;
said DS system sending a command over said channel to the RT causing battery to be supplied to said one line;
said ES system establishing a metallic connection to a test line corresponding to the directory number received from the DS system;
causing a change of status of one of the test line and said one line;
said DS system comparing the status of said one line to the status of said metallic test line to determine if the one directory number identifies the same subscriber line in the ES and DS systems.

33. The method according to claim 32 wherein said causing step comprises the step of changing the on-hook and off-hook status.

34. The method according to claim 32 further comprising the step of said DS system sending a command over said channel to the RT following said comparing step causing said battery to be inhibited so that battery is not supplied to the line.

35. The method according to claim 32 further comprising the step of initiating a cutover of service by said DS system sending a command over said channel to the RT causing battery to be suplied to said one line and disconnecting the metallic line connected to said ES system which previously served said one line.

36. In a channel unit (CU) that provides service to an associated subscriber line by interfacing the line to a remote terminal (RT), the CU including means for supplying battery to the line, the improvement comprising:
means for receiving a predetermined first command signal via said RT;
means responsive to said first command signal for causing said battery supply means to be disconnected from said line without establishing another path to said line through said CU, said causing means permitting the subscriber line to be connected to the CU prior to pre-cut testing without adversely impairing existing service to the subscriber line.

37. The channel unit according to claim 36 wherein said causing means comprises means responsive to said first command signal for generating a control signal suited to control a relay having contacts disposed to prevent the battery supplying means from supplying battery to a connected subscriber line.

38. The channel unit according to claim 37 further comprising relay means responsive to said first control signal for breaking a path between said subscriber line and said battery supplying means.

39. The channel unit according to claim 36 further comprising means for receiving a second command signal, means responsive to said second command signal for causing said battery supplying means to be connected to the associated subscriber line.

40. The channel unit according to claim 39 further comprising relay means responsive to said second control signal for establishing a path between the associated subscriber line and said battery supplying means.

41. The channel unit according to claim 36 further comprising said receiving means being capable of receiving another predetermined command signal; the subscriber line associated with the CU being connected by a bridge tap line; means responsive to said another command signal for causing said bridge tap line to be disconnected from said subscriber line.

42. The channel unit according to claim 41 wherein said another command receiving means comprises means responsive to said another command signal for generating a control signal suited to control a relay having contacts disposed in series with said bridge tap line thereby permitting said bridge tap line to be disconnected from said subscriber line.

43. In a channel unit (CU) that provides service to an associated subscriber line by interfacing the line to a remote terminal (RT), the CU including means for supplying battery to the line, the improvement comprising:
means for controllably inhibiting said battery supplying means from supplying battery so that the associated subscriber line does not receive battery from the CU upon connection thereto, said inhibiting means not impairing service supplied to said associated subscriber line from an existing switch system;
means for receiving a predetermined command signal via said RT;
means responsive to said command signal for generating a control signal;
means responsive to said control signal for causing said inhibiting means to permit battery to be supplied to the associated subscriber line thereby permitting a plurality of subscriber lines to be connected to corresponding CUs without testing at the time of the initial connections.

44. The channel unit according to claim 43 wherein said causing means includes relay means responsive to said control signal for establishing a path between said subscriber line and said battery supplying means.

45. The channel unit according to claim 43 further comprising means for receiving another command signal; means responsive to said another command signal for generating another control signal; said causing means being responsive to said another control signal and causing said inhibiting means to inhibit battery from being supplied to said subscriber line.

46. The channel unit according to claim 43 further comprising means for receiving a further predetermined command signal; said subscriber line being connected to an existing switch by a bridge tap line; means responsive to said further command signal for causing said bridge tap line to be disconnected from said subscriber line.

47. The channel unit according to claim 46 wherein said further command receiving means comprises means responsive to said further command signal for generating a control signal suited to control a relay having contacts disposed to prevent said battery supply means from supplying battery to said subscriber line.

48. A method implemented by channel units (CUs) that permits a plurality of subscriber lines to be concurrently connected to respective CUs prior to service cutover testing, the method comprising the steps of:

(a) inhibiting a battery supply associated with said CUs from being coupled to CU terminals to which corresponding subscriber lines are to be connected;

(b) said subscriber lines being coupled to the respective CU's terminals without said CUs adversely impacting service supplied to the subscriber lines by an existing switch system;

(c) one of the CUs receiving a command signal;

(d) said one CU coupling the battery supply to the associated subscriber line in response to said command signal to facilitate pre-cut testing;

(e) said one CU receiving another command signal following the pre-cut testing;

(f) said CU decoupling said battery supply from the associated subscriber line upon receipt of said another command signal;

(g) repeating steps (c) through (f) for each CU so that control of remote cutover testing for each CU is facilitated while permitting a plurality of subscriber lines to be simultaneously connected to the CUs prior to the cutover testing without adversely affecting service provided by the existing switch system.

* * * * *